US010221989B2

(12) United States Patent
Ramirez et al.

(10) Patent No.: US 10,221,989 B2
(45) Date of Patent: Mar. 5, 2019

(54) TUBING MATERIAL, DOUBLE WALL STEEL TUBES AND METHOD OF MANUFACTURING A DOUBLE WALL STEEL TUBE

(71) Applicant: COOPER-STANDARD AUTOMOTIVE, INC., Novi, MI (US)

(72) Inventors: Jose Reyes Flores Ramirez, Amsterdam (NL); Krishnamachari Gopalan, Troy, MI (US); Lyle Otremba, Bloomfield Hills, MI (US)

(73) Assignee: COOPER-STANDARD AUTOMOTIVE INC., Novi, MI (US)

( * ) Notice: Subject to any disclaimer, the term of this patent is extended or adjusted under 35 U.S.C. 154(b) by 90 days.

(21) Appl. No.: 15/099,732

(22) Filed: Apr. 15, 2016

(65) Prior Publication Data

US 2017/0030509 A1    Feb. 2, 2017

Related U.S. Application Data

(60) Provisional application No. 62/197,112, filed on Jul. 27, 2015.

(51) Int. Cl.
*F16L 58/08*    (2006.01)
*B23K 1/20*    (2006.01)
(Continued)

(52) U.S. Cl.
CPC ............ *F16L 58/08* (2013.01); *B23K 1/0004* (2013.01); *B23K 1/19* (2013.01); *B23K 1/20* (2013.01);
(Continued)

(58) Field of Classification Search
CPC ........... F16L 58/08; B23K 1/20; B23K 1/219; B23K 1/19; B23K 2201/06;
(Continued)

(56) References Cited

U.S. PATENT DOCUMENTS 4,016,008 A * 4/1977 Forbes Jones ............ B22F 7/08
138/140
4,546,051 A * 10/1985 Uchida ..................... C23C 2/12
148/505
(Continued)

FOREIGN PATENT DOCUMENTS

EP    0 743 373 A1    11/1996
EP    2 216 108 A1    8/2010
(Continued)

OTHER PUBLICATIONS

Extended European Search Report for EP 16 17 4069 dated Nov. 4, 2016.

*Primary Examiner* — Craig Schneider
*Assistant Examiner* — David Deal
(74) *Attorney, Agent, or Firm* — Stephen T. Olson; Harness, Dickey & Pierce, P.L.C.

(57) ABSTRACT

A double wall steel tube includes an inner tube wall and an outer tube wall. The inner and outer tube walls are formed from a tubing material including an inner layer of iron steel, first and second outer layers of an alloy of aluminum and silicon, a first intermediate layer disposed between the inner layer and the first outer layer, and a second intermediate layer disposed between the inner layer and the second outer layer. The first and second intermediate layers include aluminum, silicon and iron. The inner and outer tube walls are brazed together.

21 Claims, 4 Drawing Sheets

(51) Int. Cl.
*C23C 2/12* (2006.01)
*C23C 2/26* (2006.01)
*B23K 1/19* (2006.01)
*C23C 2/00* (2006.01)
*C23C 2/38* (2006.01)
*B23K 1/00* (2006.01)
*B23K 101/06* (2006.01)
*B23K 103/20* (2006.01)

(52) U.S. Cl.
CPC ............ *C23C 2/00* (2013.01); *C23C 2/12* (2013.01); *C23C 2/26* (2013.01); *C23C 2/38* (2013.01); *B23K 2101/06* (2018.08); *B23K 2103/20* (2018.08)

(58) Field of Classification Search
CPC .. B23K 2202/20; B23K 2203/20; C23C 2/12; C23C 2/26; C23C 2/38
USPC ....... 138/146, 143, 142, 141, 140, 137, 145, 138/114, 170, 171
See application file for complete search history.

(56) References Cited

U.S. PATENT DOCUMENTS

| | | | | |
|---|---|---|---|---|
| 5,789,089 A * | 8/1998 | Maki | ............... | C23C 2/12 427/405 |
| 2002/0092891 A1* | 7/2002 | Pascal | ............... | B21C 37/09 228/173.6 |
| 2008/0271823 A1* | 11/2008 | Hofmann | ............... | C21D 8/02 148/531 |
| 2009/0011277 A1* | 1/2009 | Liu | ............... | C23C 2/12 428/684 |
| 2010/0021760 A1* | 1/2010 | Liu | ............... | C23C 2/02 428/653 |
| 2017/0268078 A1* | 9/2017 | Sanadres | ............... | C21D 8/0278 |

FOREIGN PATENT DOCUMENTS

| | | |
|---|---|---|
| ES | 2 274 609 T3 | 5/2007 |
| JP | 2000 271639 A | 10/2000 |
| WO | 2014/089072 A2 | 6/2014 |

* cited by examiner

Fig. 2A
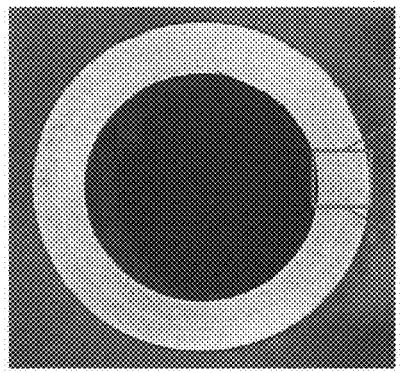
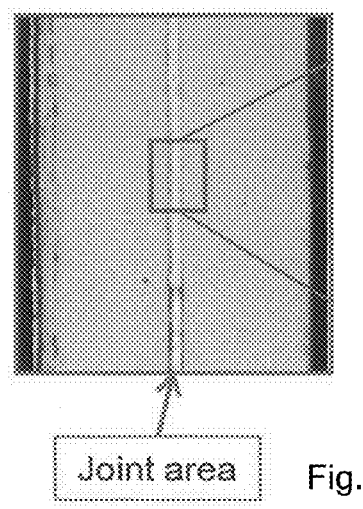
Fig. 2B
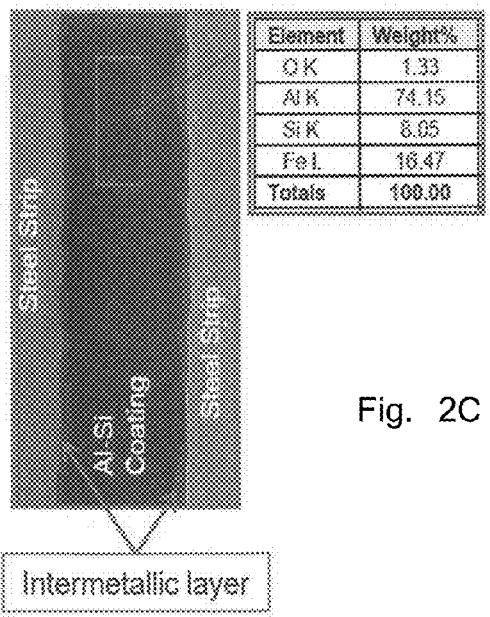
Fig. 2C

TUBING MATERIAL, DOUBLE WALL STEEL TUBES AND METHOD OF MANUFACTURING A DOUBLE WALL STEEL TUBE

CROSS-REFERENCE TO RELATED APPLICATION

This application claims priority to U.S. Provisional Patent Application No. 62/197,112 filed 24 Jul. 2015, which application is herein expressly incorporated by reference.

FIELD

The present disclosure relates generally to a tubing material and to double wall steel tubes. The present disclosure also generally relates to a method of manufacturing a double wall steel tube.

BACKGROUND

This section merely provides background information related to the present disclosure and may not constitute prior art.

Double wall tubing is conventionally used for various applications. For example, double wall tubing may be used for motor vehicle hydraulic fluids such as brake fluid. Many other applications for double wall tubing are known, including fuel lines, oil lines, heating and cooling units and the like.

Traditionally, double wall tubing may consist of a copper plated low carbon steel strip (as described in ASTM A-254 norm). The copper plated steel strip is rolled into a tubular form and subsequently brazed in a reducing atmosphere. Brazing can be achieved either by resistance welding, induction welding or furnace fusion welding. In order to achieve a proper joint, it is necessary to reach an approximate temperature of 1010° C. The layers fuse or solidify together as the temperature decreases.

Exposing low carbon steel based metal to a temperature range of 1010° C. to 1200° C. causes a metallurgical transformation known as recrystallization. This metallurgical transformation may negatively impact the grain size, as well as the overall mechanical properties of the steel. Consequently, these brazing conditions involving high temperatures greatly limit the range of steel grades suitable for use with double wall tubes.

While known double wall steel tubes and related methods of manufacturing double wall steel tubes have proven to be generally acceptable for their intended uses, a continuous need for improvement exists in the relative art.

SUMMARY

This section provides a general summary of the disclosure, and is not a comprehensive disclosure of its full scope or all of its features.

In accordance with one particular aspect, the present teachings provide a tubing material including an inner layer, first and second outer layers and first and second intermediate layers. The inner layer is iron. The first and second outer layers are an alloy of aluminum and silicon. The first intermediate layer is disposed between the inner layer and the first outer layer. The second intermediate layer is disposed between the inner layer and the second outer layer. The first and second intermediate layers include aluminum, silicon and iron.

In accordance with another particular aspect, the present teachings provide a double wall steel tube including an inner tube wall and an outer tube wall. The inner and outer tube walls are formed from a tubing material including an inner layer, first and second outer layers and first and second intermediate layers. The inner layer is iron. The first and second outer layers include aluminum and silicon. The first intermediate layer is disposed between the inner layer and the first outer layer. The second intermediate layer is disposed between the inner layer and the second outer layer. The first and second intermediate layers include aluminum, silicon and iron.

In accordance with yet another particular aspect, the present teachings provide a method of manufacturing a double wall steel tube. The method includes dipping a steel substrate into a liquid bath of aluminum and silicon to create outer layers of aluminum and silicon on the steel substrate. The method additionally includes reacting the aluminum and silicon with the steel to create first and second intermediate layers of aluminum, silicon and iron. The method further includes roll forming a resulting tubing material into a double wall tube having an inner tube wall and outer tube wall. The method still further includes brazing the double wall tube to fuse the inner and outer tube walls.

Further areas of applicability will become apparent from the description provided herein. The description and specific examples in this summary are intended for purposes of illustration only and are not intended to limit the scope of the present disclosure.

DRAWINGS

The present teachings will become more fully understood from the detailed description, any appended claims and the following drawings. The drawings are for illustrative purposes only and are not intended to limit the scope of the present disclosure.

FIG. 2A is a cross-sectional image similar to FIG. 2.

FIG. 2B is an enlarged view of the portion boxed in FIG. 2A.

FIG. 2C is an enlarged view of the portion boxed in FIG. 2B.

Corresponding reference numerals indicate corresponding parts throughout the several views of the drawings.

DESCRIPTION OF VARIOUS ASPECTS

Figure 1:
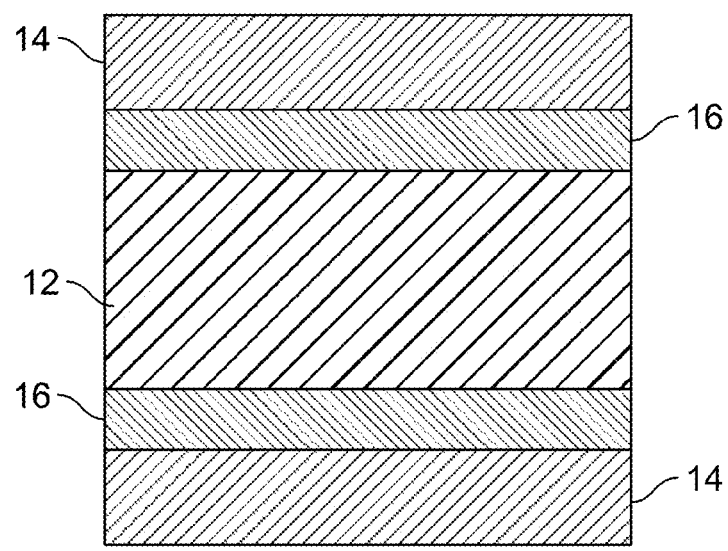
FIG. 1 is a cross-sectional view taken through the layers of a tubing material constructed in accordance with the present teachings.

The following description is merely exemplary in nature and is not intended to limit the present disclosure, its application, or uses. It should be understood that throughout the drawings, corresponding reference numerals indicate like or corresponding parts and features.

Figure 1A:
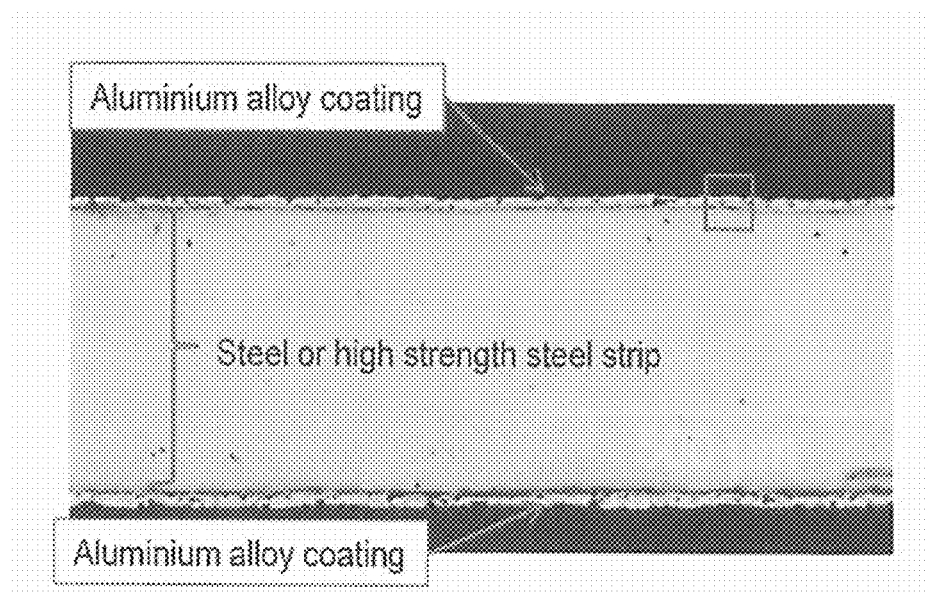
FIG. 1A is a cross-sectional image similar to FIG. 1.
Figure 1B:
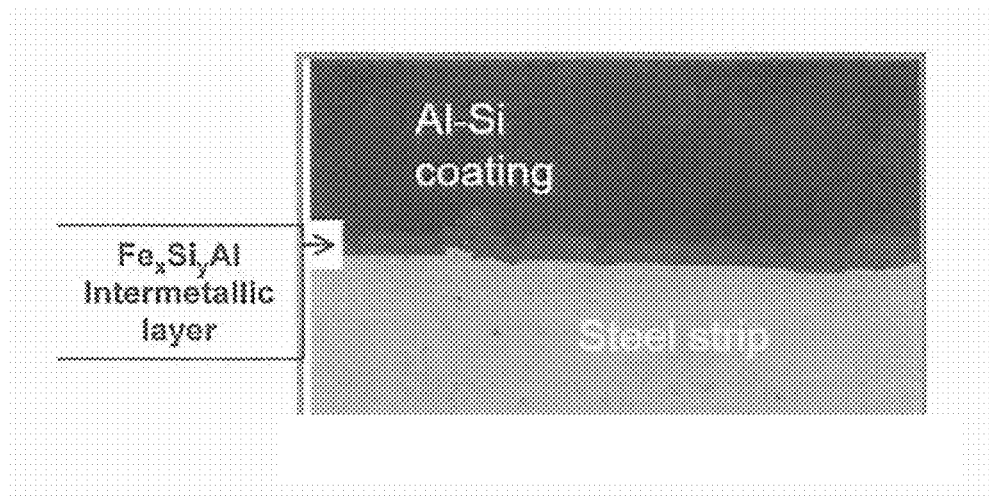
FIG. 1B is an enlarged view of the portion boxed in FIG. 1B.

With initial reference to the cross-sectional views of FIGS. 1A and 1B, a tubing material constructed in accordance with the present teachings is shown and generally identified at reference character 10. The tubing material 10 is shown to generally include an inner layer 12, first and second outer layers 14 and first and second intermediate layers 16. The inner layer 12 may be steel or high strength steel strip. The outer layers 14 may be an aluminum alloy coating of aluminum and silicon. The intermediate layers 16 may be intermetallic phases.

The tubing material 10 may be the result of a hot dip process. A hot dip aluminized coating consists of a heterogeneous assembly of different phases which are formed due to metallurgical reactions between iron and aluminum when a ferrite substrate is immersed into molten aluminum. Through a conventional hot dip process using molten aluminum, the coating after solidification consists of an outer layer of 100% aluminum and intermediate layers, called alloy layers, consisting of intermetallic phases of FeAl3 and Fe2Al5. The growth kinetics of this phase have been reported to be diffusion controlled where the rate determining step is the diffusion of Al atoms through the boundary layer Fe2Al5.

According to the present teachings, a steel substrate 12 is treated in hot dip bath. In one particular application, the steel substrate 12 is a high strength steel such as high strength, low alloy steels or HSLA steels. It will be appreciated, however, that other steels may be utilized within the scope of the present teachings. The exemplary steel may be preferred for certain applications given its relative low cost.

Due to the absence of Si from the Al melt, Fe will combine with the free Al to mainly form an Fe2Al5 intermetallic located at the metal/coating interface. The growth rate of this intermetallic phase may be very high so as to reach a size of approximately 4-7 microns within a duration of about two seconds. On the other hand, when Si is added to the Al melt, Si decreases the velocity of Fe so the combination with Al will be very slow. Consequently, due to the slow combination process between Al—Fe, the growth rate of the new formed intermetallic layer of $Fe_xSi_yAl_z$ will be slow and therefore the size will be between approximately 500 nm and 3 microns during a duration of about two seconds. In addition, Si beneficially brings temperature stability to the process. This means that the $Fe_xSi_yAl_z$ intermetallic layer is not and will not be adversely affected by temperature during the brazing process. In other words, the $Fe_xSi_yAl_z$ intermetallic layer will not grow. Beyond 6 weight %, Si may not have a further appreciable impact on the size (i.e., thickness) of the intermetallic layer. Consequently, it is possible to reach the eutectic point 12 weight % in which is easier to perform a hot dip process with a complete miscibility of Al and Si. This thin $Fe_xSi_yAl_z$ intermetallic layer 16 improves ductility of the coating and thereby enables more severe fabrication without peeling.

The hot dip bath may contain approximately 1-15 weight % silicon. In one particular application, the hot dip bath contains approximately 12 weight % silicon. In other applications, the hot dip bath may include a greater or lesser weight % of silicon.

Where the hot dip bath has a 12 weight % silicon, the first and second outer layers or outer coatings 14 correspondingly have a 12 weight % silicon. A lower temperature may be required to deposit the aluminum layer on the steel substrate 12 (eutectic point hot dip process). In other words, the addition of silicon enables use of a lower temperature. Having 12 weight % silicon also aids in decreasing a diffusion of iron into the aluminized layer and aluminum into the steel substrate. The thickness of the first and second outer layers 14 may range from approximately 5 microns to approximately 16 microns. In one particular application, the thickness of the first and second outer layers 14 is approximately 10 microns. In this particular application, the $Fe_xSi_yAl_z$ intermetallic layer 16 may range from approximately 2.4 microns to approximately 4.0 microns. This distinct intermetallic layer is shown particularly in the cross-sectional drawing of FIG. 1 and the further in the cross-sectional images of FIGS. 1A and 1B. In one particular application, the intermetallic layer 16 in terms of weight percentage is as follows: 44 weight % Al, 7 weight % Si and 49 weight % Fe. The composition of this "intermediate" layer resides at the location where the diffusion/reaction occurs.

Figure 2:
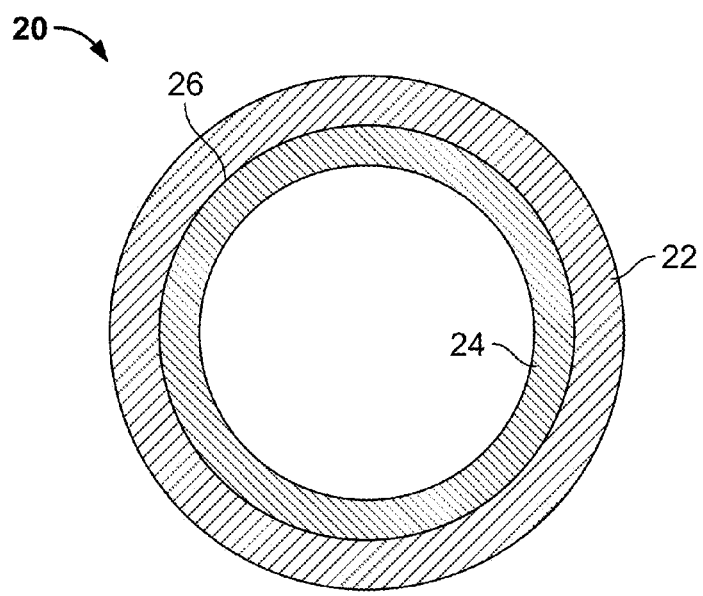
FIG. 2 is a simplified cross-sectional view of a double wall steel tube constructed in accordance with the present teachings.

With particular reference to FIGS. 2, 2A, 2B and 2C an exemplary double wall steel tube constructed with the tubing material 10 of the present teachings is shown and generally identified at reference character 20. The tubing material 10 may be rolled or otherwise formed in a conventional manner into the form shown in FIG. 2, for example, to include a first or outer tube layer 22 and a second or inner tube layer 24. It will be understood that FIG. 2 is a simplified, cross-sectional view. In this regard, the layers (see FIG. 1, e.g.) of the outer and inner tubes 22 and 24 are not specifically shown. The steel tube 20 is shown to include a brazed joint 26 between the outer and inner layers 22 and 24 of the tube 20. Traditionally, when brazing aluminum or aluminum alloys, the aluminum oxide layer disposed on the surface of the metal interferes negatively during the brazing process. Unlike brazing copper assemblies, the brazing of aluminum components typically requires the use of a flux. In metallurgy, a flux is a chemical cleaning agent, flowing agent, or purifying agent. The role of a flux in joining processes is typically dual: (1) dissolving of the oxides on the metal surface, which facilitates wetting by molten metal; and (2) acting as an oxygen barrier by coating the hot surface, preventing its oxidation.

The tubing material 10 of the present teachings may advantageously be brazed without flux. Brazing aluminized steel advantageously provides for a wider window in terms of electric current (brazing is done through a process known as conductive brazing or continuous resistance welding). At low currents (e.g., I=6 Ampere or less), the surface of the aluminized steel should be cleaned with an alkaline solution in order to achieve a good and strong brazed joint. At high currents (e.g., I=11 Ampere or more), there is no need to clean the surface of aluminized steel to provide for a good and strong brazed joint. In accordance with one application, the double wall tube 20 is brazed with an electrode force of approximately 0.89-2.1 kN, a current of approximately 6-11 kA, and a brazing time of approximately 800 msec to 3 sec.

By using aluminized steel strip, it is possible to braze the double wall tube 20 using lower temperature (480-600° C.) compared to traditional brazing for copper plated double wall steel tube (1000-1100° C.). By lowering the brazing temperature, a high strength steel may be utilized as a replacement of the traditional low-carbon low-strength commodity steel (also referred to as "mild steel"). As used herein, the term "high strength steel" will be understood to mean a steel having a yield strength greater than or equal to 400 MPa, a tensile strength greater than or equal to 480 MPa and a 50 mm elongation greater than or equal to 24%. Use of a high strength steel based material may reduce by up to 30% the total mass of the double wall tube 20 compared to use of traditional low carbon (mild) steel based material.

Figure 3:
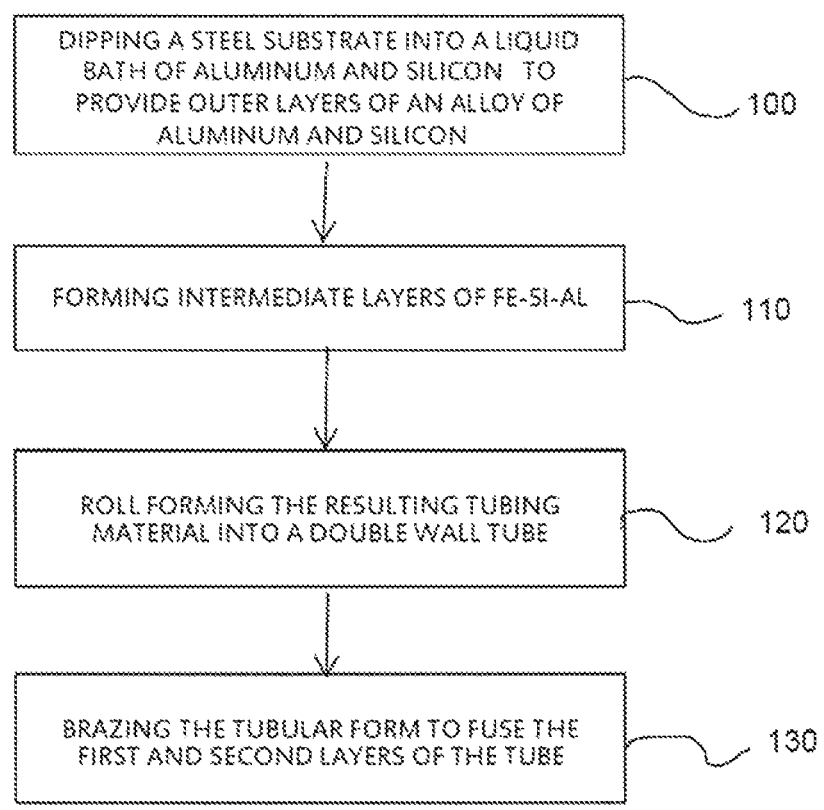
FIG. 3 illustrates the general steps of a method for manufacturing a double wall steel tube in accordance with the present teachings.

With reference to FIG. 3, it will now be understood based on the foregoing that the method of the present teachings may include a first general step 100 of dipping a steel substrate 12 into a bath of molten or liquid aluminum and silicon to provide outer layers 14 of aluminum alloy containing aluminum and silicon. In a second general step 110, the present method may include forming intermediate layers 16 of Fe—Si—Al. In a third general step 120, the present method may include roll forming the resulting tubing material 10 into a double wall tube 20. In a fourth general step 130, the present method may include brazing the tubular form to fuse the first and second layers 22 and 24 of the tube 20.

While specific examples have been discussed in the specification and illustrated in the drawings, it will be understood by those skilled in the art that various changes may be made and equivalence may be substituted for elements thereof without departing from the scope of the present teachings. Furthermore, the mixing and matching of features, elements and/or functions between various examples may be expressly contemplated herein so that one skilled in the art would appreciate from the present teachings that features, elements and/or functions of one example may be incorporated into another example as appropriate, unless discussed otherwise above. Moreover, many modifications may be made to adapt a particular situation or material to the present teachings without departing from the essential scope thereof. Therefore, it may be intended that the present teachings not be limited to the particular examples illustrated by the drawings and discussed in the specification as the best mode of presently contemplated for carrying out the present teachings but that the scope of the present disclosure will include any embodiments following within the foregoing description and any appended claims.

What is claimed is:

1. A tubing material comprising:
   an inner layer of iron alloy, the iron alloy being high strength low alloy (HSLA) steel;
   first and second outer layers of an alloy of aluminum and silicon;
   a first continuous intermediate layer disposed between the inner layer and the first outer layer, such that the inner layer does not contact the first outer layer; and
   a second continuous intermediate layer disposed between the inner layer and the second outer layer, such that the inner layer does not contact the second outer layer;
   wherein the first and second intermediate layers include aluminum, silicon and iron.

2. The tubing material of claim 1, wherein the first and second outer layers have a silicon composition of approximately 1 weight % to approximately 15 weight %.

3. The tubing material of claim 1, wherein the first and second outer layers have a silicon composition of approximately 12 weight %.

4. The tubing material of claim 1, wherein the first and second outer layers each have a thickness of approximately 5 microns to approximately 16 microns.

5. The tubing material of claim 1, wherein the first and second outer layers each have a thickness of about 10 microns.

6. The tubing material of claim 1, wherein the first and second continuous intermediate layers include 44 weight % aluminum, 7 weight % silicon and 49 weight % iron.

7. A double wall steel tube comprising:
   an inner tube wall;
   an outer tube wall; and
   a brazed joint between the inner tube wall and the outer tube wall, the brazed joint not including a flux,
   wherein the inner tube wall and the outer tube wall are both formed from a tubing material including an inner layer of iron alloy, first and second outer layers of an alloy of aluminum and silicon, a first intermediate layer disposed between the inner layer and the first outer layer, and a second intermediate layer disposed between the inner layer and the second outer layer, and
   wherein the first and second intermediate layers include aluminum, silicon and iron.

8. The double wall steel tube of claim 7, wherein the first and second outer layers have a silicon composition of approximately 1 weight % to approximately 15 weight %.

9. The double wall steel tube of claim 7, wherein the first and second outer layers have a silicon composition of approximately 12 weight %.

10. The double wall steel tube of claim 7, wherein the first and second outer layers each have a thickness of approximately 5 microns to approximately 16 microns.

11. The double wall steel tube of claim 7, wherein the first and second outer layers have a thickness of about 10 microns.

12. The double wall steel tube of claim 7, wherein the iron alloy is a high strength steel.

13. The double wall steel tube of claim 7, wherein the first and second intermediate layers include 44 weight % aluminum, 7 weight % silicon and 49 weight % iron.

14. A method of manufacturing the double wall steel tube of claim 7, the method comprising:
   dipping an iron alloy substrate into a liquid bath of aluminum and silicon to create outer layers of an alloy of aluminum and silicon on the steel substrate;
   reacting the aluminum and silicon with iron of the iron alloy substrate to create first and second intermediate layers of aluminum, silicon and iron;
   roll forming a resulting tubing material into a double wall tube having an inner tube wall and outer tube wall; and
   brazing the double wall tube to fuse the inner tube wall and the outer tube wall, wherein
   the brazing is performed without a flux.

15. The method of manufacturing a double wall steel tube of claim 14, wherein brazing the double wall tube includes brazing at a temperature between approximately 480° C. and approximately 600° C.

16. The method of manufacturing a double wall steel tube of claim 14, wherein the first and second outer layers have a silicon composition of approximately 1 weight % to approximately 15 weight %.

17. The method of manufacturing a double wall steel tube of claim 14, wherein the first and second outer layers have a silicon composition of approximately 12 weight %.

18. The method of manufacturing a double wall steel tube of claim 14, wherein the first and second outer layers each have a thickness of approximately 5 microns to approximately 16 microns.

19. The method of manufacturing a double wall steel tube of claim 14, wherein the first and second outer layers each have a thickness of about 10 microns.

20. The method of manufacturing a double wall steel tube of claim 14, wherein the iron alloy is a high strength steel.

21. The method of manufacturing a double wall steel tube of claim 14, wherein the first and second intermediate layers include 44 weight % aluminum, 7 weight % silicon and 49 weight % iron.

* * * * *